United States Patent

Wagner

[11] Patent Number: 5,241,593
[45] Date of Patent: Aug. 31, 1993

[54] TELEPHONE AND TELEPHONE CORD RETRACTION DEVICE, AND METHOD OF MAKING

[76] Inventor: Ronald D. Wagner, 3260 Industry Dr., Signal Hill, Calif. 90806

[21] Appl. No.: 696,817

[22] Filed: May 7, 1991

Related U.S. Application Data

[63] Continuation-in-part of Ser. No. 493,233, Mar. 14, 1990.

[51] Int. Cl.⁵ .................. H04M 1/00; H02G 11/02
[52] U.S. Cl. .................... 379/438; 191/12.4
[58] Field of Search ............ 191/12.4; 242/107.11; 379/58, 419, 428, 430, 437, 438, 457; 381/25

[56] References Cited

U.S. PATENT DOCUMENTS

| | | | |
|---|---|---|---|
| 3,705,962 | 12/1972 | Banister | 191/12.4 |
| 3,953,688 | 4/1976 | Rocha | 379/438 |
| 3,984,645 | 10/1976 | Kresch | 379/430 |
| 4,499,341 | 2/1985 | Boyd | 191/12.4 |
| 4,646,987 | 3/1987 | Peterson | 242/107.11 |
| 4,727,569 | 2/1988 | Kutrieb et al. | 379/58 |
| 4,940,859 | 7/1990 | Peterson | 191/12.4 |
| 5,005,202 | 4/1991 | Pavel | 381/25 |

FOREIGN PATENT DOCUMENTS

| | | | |
|---|---|---|---|
| 3417931 | 11/1985 | Fed. Rep. of Germany | 379/438 |
| 56-93463 | 7/1981 | Japan | 379/438 |
| 9161963 | 9/1984 | Japan | 379/438 |
| 0100054 | 5/1987 | Japan | 379/438 |
| 0073846 | 3/1989 | Japan | 379/438 |

*Primary Examiner*—Curtis Kuntz
*Assistant Examiner*—William D. Cumming
*Attorney, Agent, or Firm*—William L. Klima

[57] ABSTRACT

A telephone cord retraction device to be positioned between a base unit and handset of a telephone, and to a telephone provided with such a device. The telephone retraction device includes a spiral spring telephone connector connecting the telephone to a retractable telephone cord of the handset.

17 Claims, 2 Drawing Sheets

TELEPHONE AND TELEPHONE CORD RETRACTION DEVICE, AND METHOD OF MAKING

This is a continuation-in-part of copending application Ser. No. 07/493,233 filed on Mar. 14, 1990.

BACKGROUND OF THE INVENTION

1. Field of the Invention

This invention relates to a telephone having a retractable cord, a telephone retractable cord device to be positioned between the headset or handset and base unit of a telephone, and a special retractable telephone cord and method of making. More specifically, the present invention relates to a telephone retractable cord device comprising a housing having a chamber with a reel disposed within the chamber. The reel stores a retractable telephone cord, which connects the headset or handset to the base unit with a communication linkage. Preferably, the reel is provided with a cavity or space for receiving a spiral spring telephone connector, which connects the retractable telephone cord to a connected terminal of the device in a manner to compensate for the relative rotation between the reel and the housing of the device, and to provide means for retracting the telephone cord onto the reel. Further, this invention relates to a retractable telephone cord constructed for application with telephone retractable cord device and telephone according to the present invention.

3. Prior Art

Conventional telephones are provided with a base unit connected to a headset or handset by means of a cord formed in a coiled manner. With use, the cord of this type becomes tangled and unsightly due to twisting of the handset relative to the base unit a number of times over a period of time. After being sufficiently tangled or twisted, the telephone cord of this type becomes substantially unusable since the effective length of the cord is substantially reduced so that it is difficult for a user to remove the handset a sufficient distance from the base unit to use the telephone.

A new product has been recently marketed that can be defined as a swivel connector. This connector includes a male terminal received within the female terminal of the handset and a female terminal to receive the end of the conventional coiled type telephone cord. The swivel connector allows the handset to be rotated freely about the base unit without tangling or twisting the conventional telephone cord. This prior art device is only relevant as a product that competes in the same market with device according to the present invention, but is totally unrelated in structure or function.

U.S. Pat. No. 4,940,859 discloses a telephone cord take-up reel assembly comprising a housing with a take-up reel having a predetermined length of telephone cord. This assembly utilizes a slip ring connector to accommodate relative rotation between the housing and take-up reel. However, the focus of this patent is to provide an assembly that is constructed and designed to attached to a wall in a room with the retractable telephone cord connecting to the base unit of a conventional telephone, as opposed to being positioned between the base unit and handset of a conventional telephone. Further, the telephone cord used in this assembly is of a conventional gage. Such a telephone cord and assembly could not be utilized in the present invention, which requires an unconventional retractable telephone cord to accomplished its function of providing a retractable telephone cord between the base unit handset of a telephone. Specifically, an unconventional and unavailable telephone cord needs to be constructed for use in the present invention to achieve the compact dimensions of the device to enable it to be feasibly positioned between the base unit and headset of a telephone. Further, the unconventional and unavailable spiral spring conductor of an embodiment of the present invention distinguishes the present invention from the assembly of U.S. Pat. No. 4,940,859.

SUMMARY OF THE INVENTION

Accordingly, it is a primary object of the present invention to provide a telephone retractable cord device with a retractable telephone cord of such construction to enable the device to be positioned between the handset and base unit of a telephone.

Another object of the present invention is to provide a telephone retractable cord device with a retractable telephone cord mounted on a spring biased reel, and of such construction to enable the device to be positioned between the handset and base unit of a telephone.

A further object of the present invention is to provide a telephone retractable cord device having a retractable telephone cord mounted on a reel with a spiral spring telephone connector connecting the retractable telephone cord with a terminal associated with the housing of the device to accommodate relative movement between the reel and housing of the device, and provide the retractive force necessary to rotate the reel to retract the telephone cord.

An even further object of the present invention is to provide a telephone retractable cord device having a retractable cord mounted on a reel, said reel having a cavity for receiving a spiral spring telephone connector which connects the retractable telephone cord with a telephone terminal with the housing of the device.

Another primary object of the present invention is to provide a telephone having a telephone retractable cord device positioned between the handset and the base unit of the telephone.

A further object of the present invention is to provide a telephone having a telephone retractable cord device including a retractable cord mounted on a reel.

A still further object of the present invention is to provide a telephone with a telephone retractable cord device including a retractable telephone cord mounted on a reel and a spiral telephone connector connecting the retractable cord with either the handset or the base unit of the telephone.

An even further object of the present invention is to provide a telephone having a telephone retractable cord device including a retractable telephone cord mounted on a reel, said reel having a cavity for receiving a spiral spring telephone connector for accommodating relative movement between the reel and housing of the device and providing the retracting force to reel the retractable cord onto the reel.

Another primary object of the present invention is to provide a retractable telephone cord constructed for application with the telephone retractable cord device and telephone according to the present invention.

These and other objects of the present invention can be achieved by providing a separate telephone retractable cord device, according to the present invention, between the handset and base unit of a conventional telephone. Preferably, the telephone retractable cord device includes a male telephone terminal which is received within the standard female terminal of the conventional base unit with the retractable telephone cord being provided with a male connector to be received within the standard female terminal of the conventional handset. Alternatively, the telephone retractable cord device according to the present invention can be constructed to connect into the standard female terminal on a conventional handset with the retractable telephone cord connecting instead into the base unit.

Further, the telephone retractable cord device according to the present invention can be incorporated into what would otherwise be a conventional telephone having a handset and base unit. Specifically, the telephone retractable cord device according to the present invention can be incorporated into what would otherwise be a conventional handset and/or conventional base unit of a conventional telephone. Preferably, the telephone retractable cord device according to the present invention would be incorporated into the base unit of a telephone constructed as a single unit, for example, where the housing of the telephone retractable cord device would be molded as a single unit with the outer cover of the base unit. In any event, the present invention covers all telephone retractable cord devices of similar construction positioned between the handset and base unit of a telephone.

The basic structure of a preferred embodiment of the present invention includes a reel mounted within a housing of the device. In the assembled device, the retractable telephone cord is wound around the reel and stored until use. The retractable telephone cord is accommodated through an opening in the housing through which the telephone cord is repeatedly extended and retracted during and after each use. The device includes a spiral spring for providing the retracted force for rotating the reel to retract the extended telephone cords back into the housing. Preferably, the spiral spring is a spiral spring telephone connector defined by a strip of connector wound in a spiral spring in such a manner, or constructed, to act or provide a retracted force upon winding the spiral spring. Preferably, the spiral spring telephone connector is constructed of separate electrically conducting wires set apart a distance and parallel to each other within the strip, preferably made of an insulating plastic material. More preferably, one of the four electrical wire conductors is made of stainless steel with the remaining three conductors made of copper to reduce the noise level resulting from the use of the connector in the communication linkage.

The spiral spring utilized in the telephone retractable cord device is mounted within the housing. Preferably, the spiral spring is mounted within a cavity of the reel to make the device more compact. Alternatively, the spiral spring could be positioned along one or both sides of the reel in another embodiment of the device. In the most preferred embodiment, the reel of the device is provided with a cavity for receiving a spiral spring in the format of a spiral spring telephone connector as discussed in detail above. One end of the spiral spring connector is connected to a telephone terminal associated with the housing of the device and an opposite end of the spiral spring telephone connector passes through an opening in the reel and is connected to the retractable telephone cord.

The reel of the device is rotatably mounted within the housing. For example, the housing can be provided with a hub received within a circular cavity of the reel. The hub centers and maintains the position of the reel within the housing during rotation of the reel within the housing. Consider, in one embodiment a fastener such as a screw is provided through one side of the housing and connects through the reel and the hub to form a pivotal access of location of the reel.

DETAILED DESCRIPTION OF PREFERRED EMBODIMENTS

Figure 1:
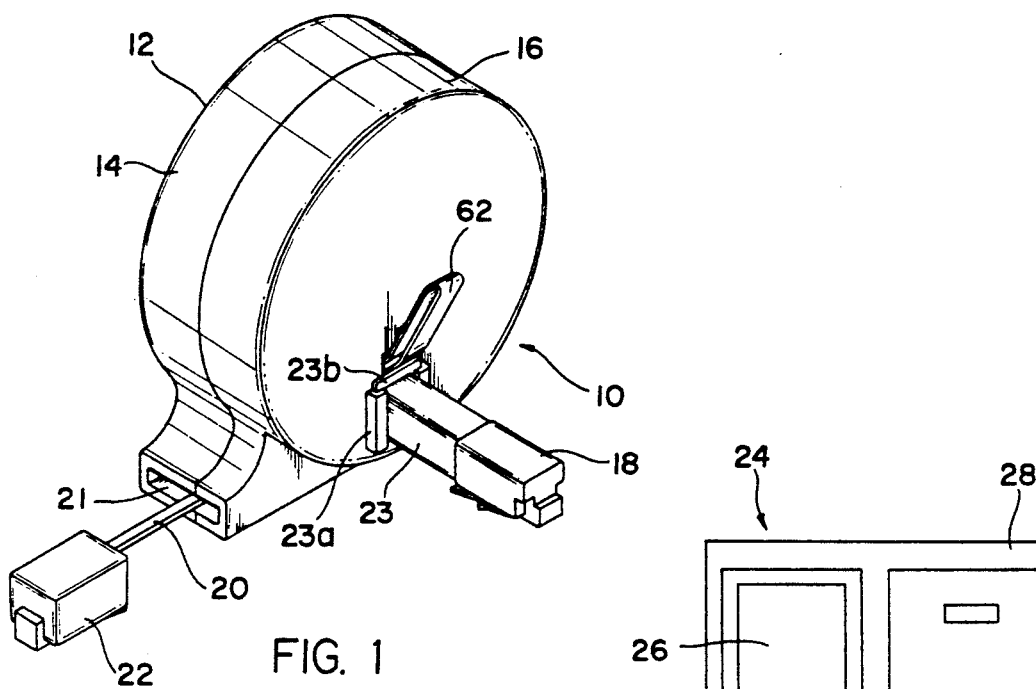
FIG. 1 is a perspective view of the telephone retractable cord device according to the present invention.

An embodiment of the telephone retractable cord device 10 according to the present invention is shown in FIG. 1. The device 10 includes a housing 12 having sides 14,16.

A male telephone connector terminal 18 projects from the side 16 of the housing 12. The male telephone connector terminal 18 can be a conventional telephone connector, or a custom design one for a particular application. Extending through a slot 21 in the housing 12 is retractable telephone cord 20 provided with a male telephone connector terminal 22. Preferably, the housing 12 is made of injection molded plastic.

In a preferred embodiment, the side 16 of the housing 12 is provided with a repositionable extension 23 from which the male telephone connector terminal 22 extends therefrom. The base of the extension is provided with gripping portions, which cooperate with gripping portions 23b provided on the side 16 of the housing 12. More specifically, the gripping portions 23a of the extension 23 can be slide into the gripping portions 23b of the side 16 of the housing 12. The extension is square-shaped in cross section and is provided with gripping portions on four (4) sides thereof. The extension 23 can be rotated relative to the housing 12, by sliding the extension relative to the housing 12 to disengage the gripping portions 23a,23b, rotating to the desired 90 degree increment angle, and reinsertion by sliding the extension re-engaging the gripping portions 23a,23b. This features allows the device 10 to be mounted on a variety of conventional base units, no matter what the orientation of the base unit (i.e. desk top or wall installation). Preferably, the extension is made of injection molded plastic with the gripping portions 23a,23b also being injection molded. This feature provide means associated with the connector terminal 18 to vary the orientation of the connector terminal 18 relative to the housing 16 to accommodate various models of the telephones.

Figure 2:
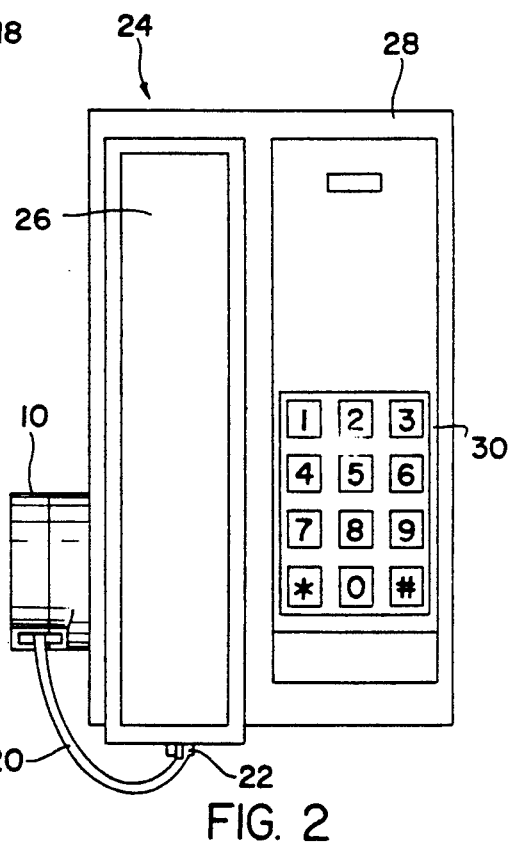
FIG. 2 is a top elevational view of a telephone provided with telephone retractable cord device accord to the present invention.

As shown in FIG. 2, a conventional telephone 24 having a conventional handset 26, conventional base unit 28 and keyboard 30 is provided with the telephone retractable cord device 10. In a preferred embodiment of the telephone according to the present invention, the telephone retractable device is made integral with the base unit. Specifically, the housing of the telephone retractable cord device is molded as a single piece with the housing of the base unit. Alternatively, a headset can be substituted for the handset 26.

Figure 3:
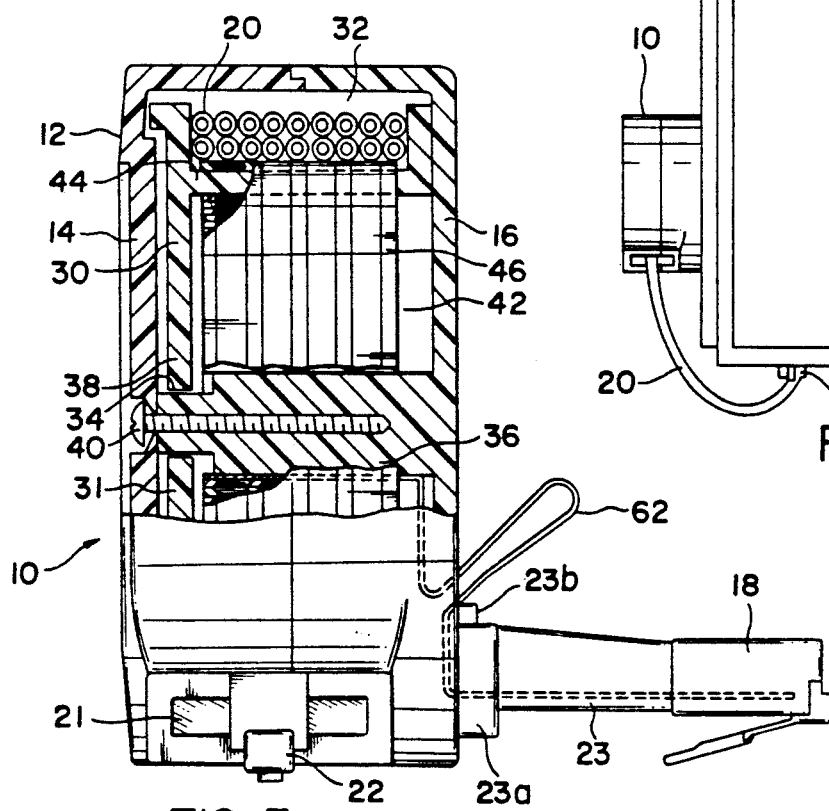
FIG. 3 is a front partial cross-sectional view the device according to present invention, as shown in FIG. 1.

A detailed cross-sectional view of the telephone retractable cord device according to the present invention is shown in FIG. 3. A reel 30 is rotatably mounted within a cavity 32 within the housing 12. More specifically, the side 31 of the reel 30 is provided with hole 34 acting as a sleeve, which receives a hub 36 extending inwardly from side 16 of the housing 12. A screw 40 passes through a hole in the side 14 of housing 12 into the hub 36 to provide a pivotal axis for rotation of the reel 30.

Figure 4:
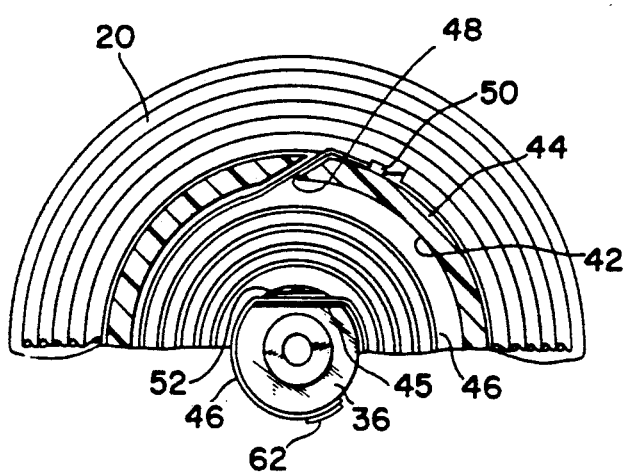
FIG. 4 is a side cross-sectional view of the reel of the device, as shown in FIG. 3.

The reel 30 is constructed with a spool wall 32, preferable circular in shape, which together with the outer surface of the hub 36 define a circular cavity 42. A spiral spring telephone connector 46 is disposed within the cavity 42. As shown in FIGS. 3 and 4, one end of the spiral spring telephone connector 46 is connected to the reel 30. Specifically, an outer end of the spiral spring telephone connector 46 passes through an opening 48 in the spool wall 44, and connects the retractable telephone cord 20 at electrical connection 50. For example, the end of the spiral spring telephone connector 46 can be soldered, as shown, to the end of the retractable telephone cord 20. An opposite end of the spiral telephone connector 46 is connected to the housing 16. Specifically, an inner end of the spiral spring telephone connector 46 is bent at approximately ninety (90) degrees and fits into a slot 45 in the hub 36, as shown in FIGS. 4 and 5, to anchor that end of the spring from movement within the housing 12 during a winding operation.

Figure 5:
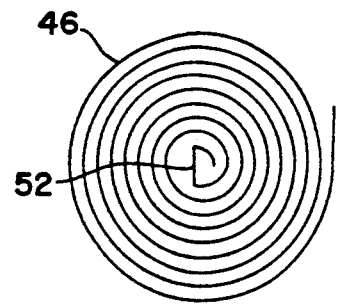
FIG. 5 is a detailed side elevational view of the spiral spring telephone connector according to the present invention.

The spiral spring telephone connector 46, is shown removed from the cavity 42 of the reel 30 in FIG. 5. The spiral spring telephone connector 46 is shown in an unwound mode with space between adjacent surfaces thereof. Upon rotating of the reel 30 during use, the spiral spring telephone connector becomes wound tightly with adjacent surfaces thereof coming into contact with each other. The spiral spring telephone connector 46 provides means for retracting the telephone cord 20 by winding the reel 30 when the telephone cord 20 is at least partially extracted for the device 10.

An example of the construction of the spiral spring telephone connector according to the present invention is as follows. Four (4) copper telephone wires are each made from a flat sheet of copper of 0.062 inch in width and 3 mils (1/1000 inch) in thickness. The four (4) telephone wires are arranged parallel and side-by-side with a spacing of 100 centers, and then laminated between two (2) pieces of MYLAR of 2 mils thickness with a hot glue adhesive sprayed on the inside surfaces of the MYLAR prior to the lamination step. To this assembly a laminating pressure is applied which causes the copper wires to adhere to the MYLAR, which in the assembly acts as an insulator. The completed assembly, for example, would have a length of four (4) feet, four (4) inches.

To create the spiral spring telephone connectors coiling ability, the above-described assembly is coiled around a 5/16 inch mandrel and placed in a heated oven at 200 degrees F., + or −10 degrees F., for 1.5 hours.

Figure 6:
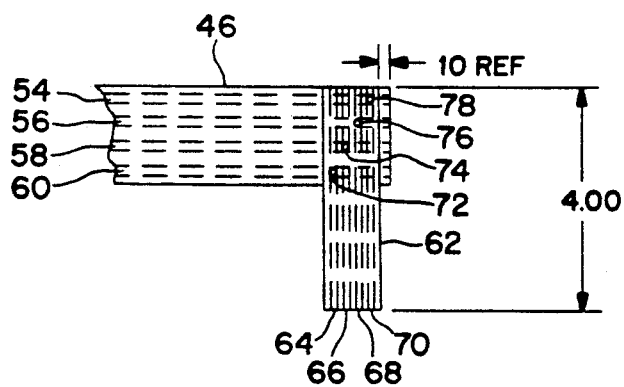
FIG. 6 is a detailed view of the spiral spring telephone connector according to the present invention illustrating a connection with a lead to the housing terminal.

As shown in FIG. 6, the spiral spring telephone connector 46 is provided with four (4) telephone wires 54,56,58,60. A lead 62 provided with four (4) telephone wires 64,66,68,70 is connected to the telephone wires of spiral spring telephone connector at connections 72,74,76,78. The lead 54 is positioned at approximately 90 degrees with respect of the length of the spiral spring connector 46 with an opposite end connecting to the male telephone terminal connector 18 extending from the housing 12. For example, the lead 54 is made of four (4) flat copper wires of 0.25 inch width and 2 mils in thickness. The flat coppers wires are arrange parallel to each other and side-by-side, and then laminated under pressure between two (2) glued pieces of MYLAR of 2 mils thickness. The length of this assembly would be four (4) inches by way of example.

The spiral spring telephone connector 46 and lead 62 are connected together, for example, by a process known as "tweezer welding." A tweezer welder utilizing low current A.C. is implemented to weld through the MYLAR, in the above-described assemblies, to affix the thin flat copper wire conductors of the connector 46 and lead 62 together.

Figure 7:
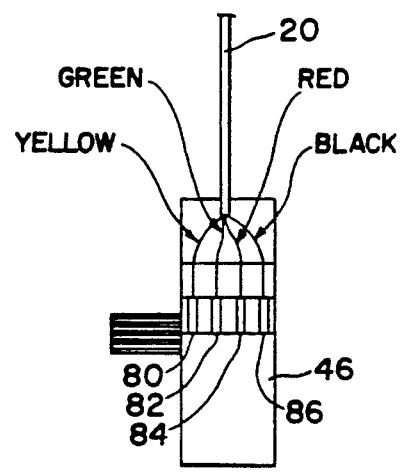
FIG. 7 is a diagrammatical view of the wire layout and electrical connections in the device according to the present invention.

The outer end of the spiral spring telephone connector 46 is connected to the telephone cord 20, as shown diagrammatically in FIG. 7. The four (4) telephone wires 56,58,60,62 of the spiral spring telephone connector 46 are connected to the four (4) telephone wires 80,82,84,86 of the retractable telephone cord 20. An opposite end of the retractable telephone cord 20 is connected to the male telephone connector terminal 22 as shown in FIG. 1, for example, by tweezer welding. During assembly, for example, the outer end of the spiral spring telephone connector 46 is connected to the telephone cord after the step of connecting the spiral spring telephone connector 46 to the lead 62.

By way of example, the retractable telephone cord 20 is made with four (4) wire conductors. Three (3) of the four (4) wire conductors are made of seven (7) strands of 38 gage stainless steel wire copper plated for enhanced noise listening clarity. The fourth wire conductor is made of seven (7) strands of 38 gage stainless steel wire, not copper plated like the other three wire conductors, for added strength. This is particularly important due to the small gauge of the overall wire and the requirements of compact size and sufficient strength to endure typical use of a telephone headset.

The wire thickness of each of the four (4) wire conductors is 12,000 mils. The insulation (ABS type) of each of the four (4) wire conductors is 3,000 mils in thickness with the total outside diameter of each assembled wire conductor being 18,000 mils. The four (4) wire conductors are twisted together with a combined total outside diameter of 72,000 mils. This assembly is again provided with a sleeve of 3,000 mils thickness (ABS type) insulation to form the completed assembly. The total length of the retractable telephone cord is seventy-six (76) inches.

OPERATION OF THE DEVICE

The device 10 is mounted on a conventional telephone by replacing the conventional coiled shaped cord with the device. Specifically, the telephone terminal 18 is plugged within the standard receptacle on the base unit 28 and provides a structural connection therewith. The telephone terminal 22 of the retractable cord 20 is then inserted within the standard receptacle of the handset 26. During use, after an incoming call is received an operator grabs the handset 26 and pulls the retractable telephone cord 20 out of the housing 12 of the device 10. The length of the cord can be changed during the telephone conversation by simply moving the handset away or towards the base unit 28. After the conversation is completed the handset 26 is returned to the base unit 28 with retractable telephone cord 20 automatically retracting within the housing 12 of the device 10. Of the spiral spring telephone connector provides a sufficient retracting force upon being wound, after the retraction of the telephone cord 20, to reel the retractable telephone cord 20 back into the housing 12 of the device 10.

I claim:

1. A telephone retractable cord device, comprising:
   a housing having a chamber;
   a reel disposed with the chamber of said housing, said reel rotatably mounted within said housing by a positioning means for positioning said reel within the chamber of said housing, said reel including a spool wall separating a peripheral trough from a cavity of said reel;
   a spiral spring telephone connector disposed within said cavity of said reel, said spiral spring telephone connector including an outer end connected to said reel and an inner end connected to said housing;
   a first telephone cord electrically connected to said outer end of said spiral spring telephone connector and wound around said reel when stored, and including a connector end extending through an access opening through said housing; and
   a second telephone cord electrically connected to said inner end of said spiral spring telephone connector, and including a connector end extending through another access opening through said housing,
   wherein said spiral spring telephone connector provides means for retracting said first telephone cord into said housing by winding said reel when said first telephone cord is at least partially extracted from the device.

2. A device according to claim 1, wherein said outer end of said spiral spring telephone connector connects to said reel by passing into an opening in said spool wall of said reel to provide a mechanical connection to cause the spring action of said reel within said housing by said spiral spring telephone connector, and wherein said spiral spring telephone connector is electrically connected with said first telephone cord through said opening in said spool wall of said reel.

3. A device according to claim 2, wherein said outer end of said spiral spring telephone connector passes through said spool wall of said reel to connect with said first telephone cord.

4. A device according to claim 2, wherein said peripheral trough is aligned with said cavity of said reel so that said first telephone cord in wound around said spiral spring telephone connector but separated by said spool wall of said reel.

5. A device according to claim 1, wherein said positioning means is defined by a hub extending inwardly from said housing into said chamber, said hub being received within a centered hole through said reel.

6. A device according to claim 2, wherein said positioning means is defined by a hub extending inwardly from said housing into said chamber, said hub being received within a centered hole through said reel.

7. A device according to claim 6, wherein said spiral spring telephone connector is positioned within said cavity of said reel between said spool wall of said reel and said hub.

8. A device according to claim 7, wherein a fastener extends through said housing and said hub to define an axis of rotation of said reel.

9. A device according to claim 1, wherein said housing includes a protrusion of the side thereof, and accommodates said second telephone cord access opening.

10. A device according to claim 1, wherein said device is configured so that it can be positioned between a handset and receiver of a telephone, and retractably connects the handset to the receiver by a telephone communication linkage defined by the combination of said first telephone cord, said spiral spring telephone connector and said second telephone cord.

11. A device according to claim 1, wherein said housing is defined by a pair of shells connected together.

12. A device according to claim 1, wherein said spiral spring telephone connector is defined by a strip comprising a plurality of conductors separated by insulation formed into a spiral, said spiral spring telephone connector acts as a retraction spring to rotate said reel relative to said housing when compressed.

13. A device according to claim 1, including a telephone base unit and a headset connected with said device to form an assembled unit.

14. A device according to claim 1, wherein said spiral spring telephone connector accommodates relative rotation between said reel and said housing during use.

15. A device according to claim 1, wherein said spiral spring connector is made of four flat copper conductors arranged parallel and set apart a distance from each other, and laminated between sheet of MYLAR to form an assembly.

16. A device according to claim 1, wherein said retractable telephone cord comprises four wire connectors with three of said connectors being made of strands of copper coated stainless steel wire and one connector being made of strands of stainless steel wire not copper coated.

17. A device according to claim 1, including means for varying the orientation of said connector end of said first telephone cord relative to said housing to accommodate various models of telephones.

* * * * *